June 9, 1942.　　　　J. NORRED　　　　2,286,154
BICYCLE
Filed Nov. 10, 1941　　　　3 Sheets-Sheet 1
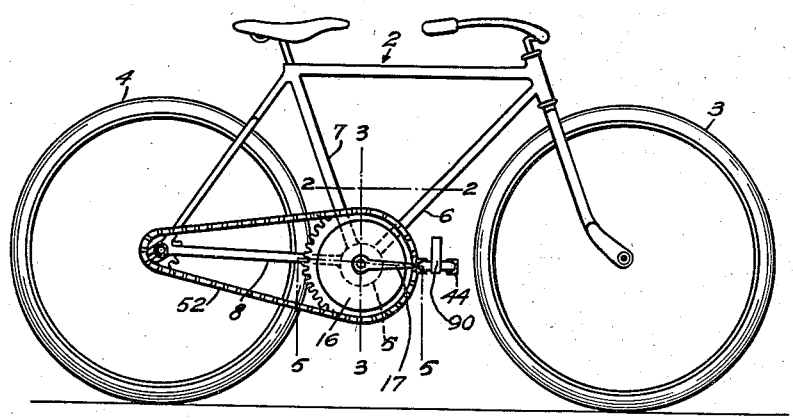
Fig.I
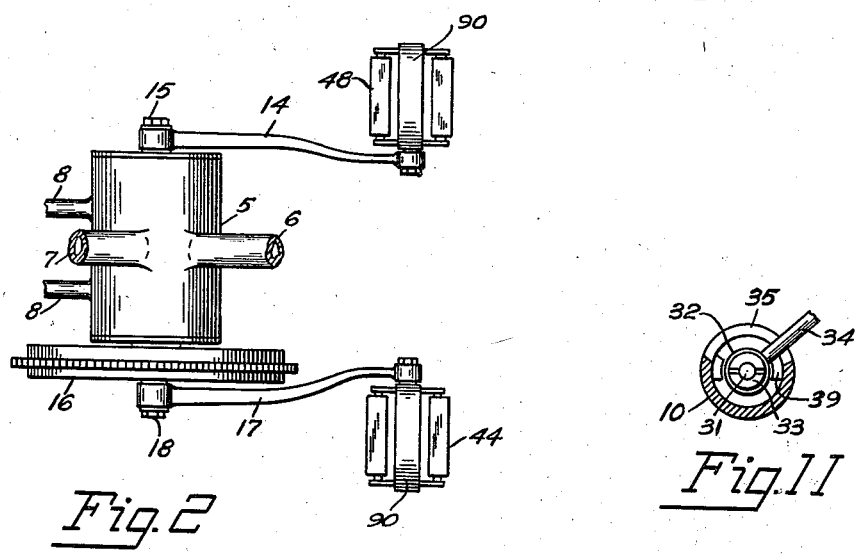
Fig.2　　　　Fig.II
Inventor:
John Norred
By C.C. Sofer
Atty.

June 9, 1942.　　　　J. NORRED　　　　2,286,154
BICYCLE
Filed Nov. 10, 1941　　　3 Sheets-Sheet 2
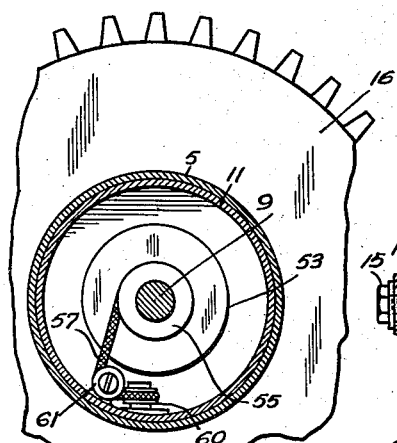
Fig.4
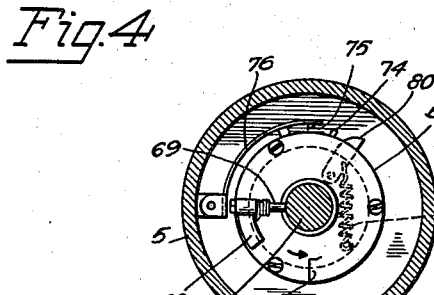
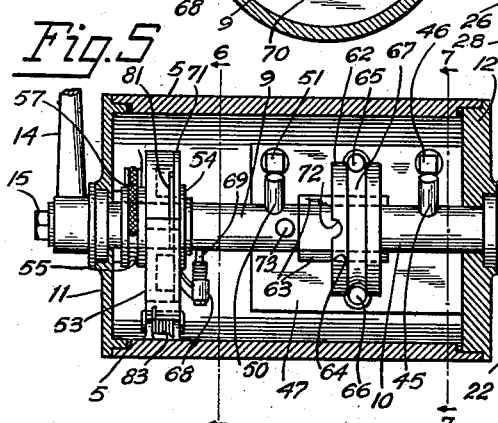
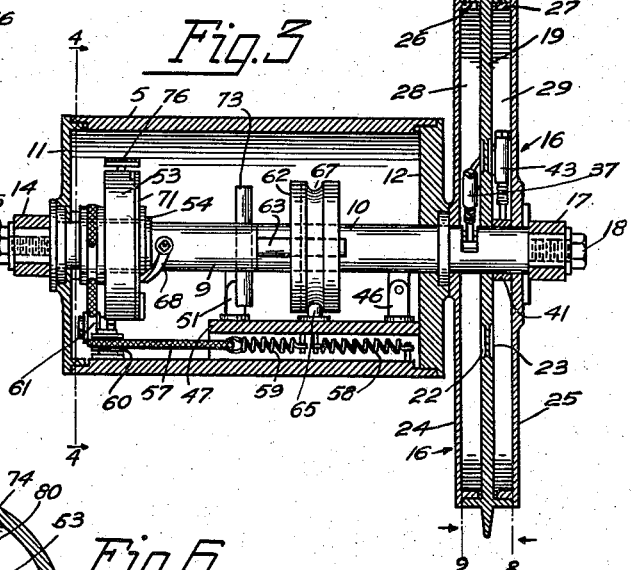
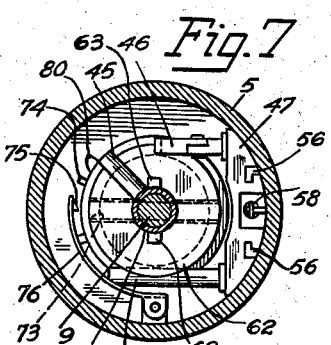
Inventor:
John Norred
By C. P. Sofer
Atty.

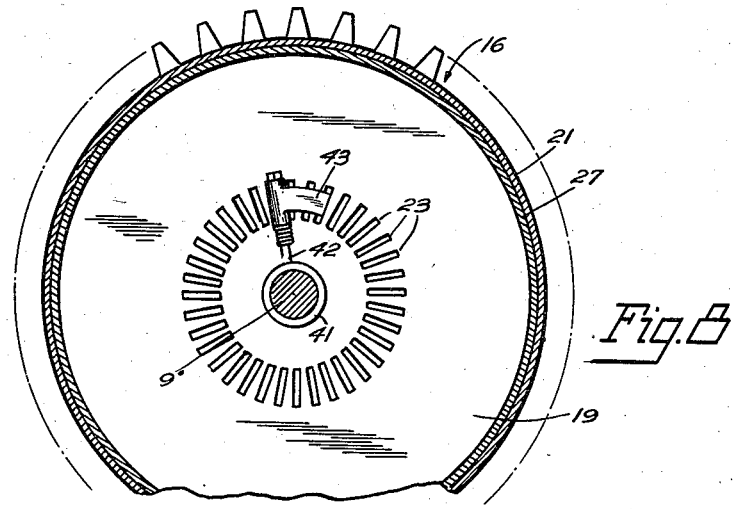
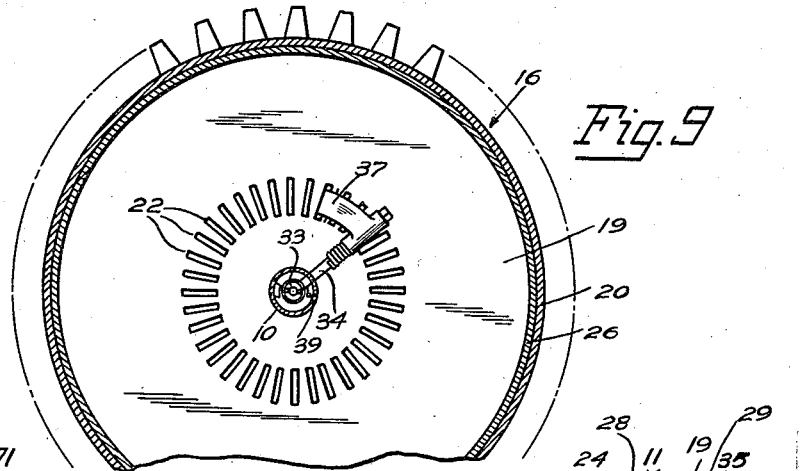
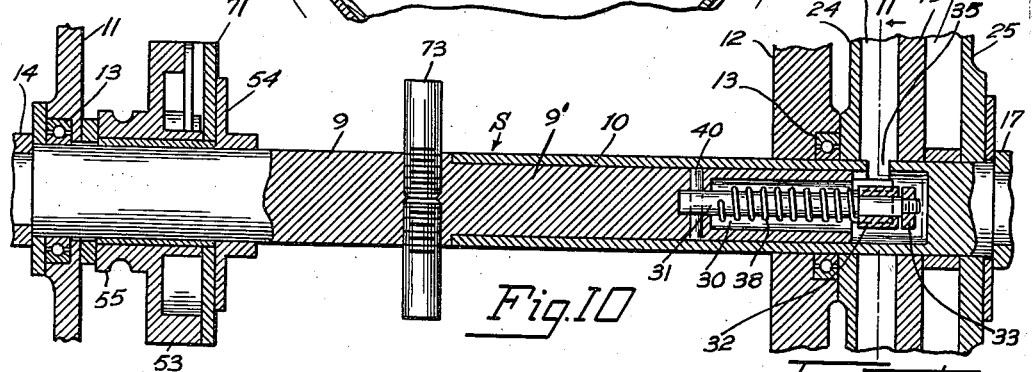

Patented June 9, 1942

2,286,154

UNITED STATES PATENT OFFICE 2,286,154

BICYCLE

John Norred, Chicago, Ill.

Application November 10, 1941, Serial No. 418,511

13 Claims. (Cl. 74—143)

The invention relates in general to improvements in wheeled vehicles and more particularly to an improved bicycle.

An object of the invention is the provision of a bicycle having a pedal or driving means wherein the operating pedals are arranged in such a manner as to enable the rider of the bicycle to propel the same by an up and down movement of the feet instead of requiring the movement of the feet along a circular orbit as is the case in the operation of bicycles of the conventional type.

Another object of the invention is to provide an improved bicycle wherein the operating pedals are moved up and down in substantially vertical paths and wherein a novel construction is provided for transmitting power from the pedals to the sprocket wheel through the medium of a pair of driving shafts respectively associated with each pedal.

Still another object of the invention is to provide a bicycle structure having a pair of pedal levers secured respectively to concentrically disposed left and right shaft portions and extending forwardly therefrom and having novel ratchet and pawl connections between the respective shaft portions and the driving sprocket wheel for transmitting operating power to the rear wheel of the vehicle.

A further object of the invention is the provision of a clutch device associated with the driving mechanism which when operated by a predetermined reverse movement of one of the operating pedals connects the concentric shafts so that the pedals may be moved along circular paths in the conventional manner of operating a bicycle.

A still further object of the invention is the provision of a means for disassociating the clutch device from the respective shaft portions when a pedal is moved in a reverse direction to again permit the pedals to be operated in an up and down movement to transmit power to the rear wheel of the bicycle.

Further objects and advantages of the invention will become apparent as the description of the same proceeds and the invention will be best understood from a consideration of the following detailed description taken in connection with the accompanying drawings wherein.

Fig. 1 is a view in side elevation of the bicycle structure showing the operating mechanism associated therewith;

Fig. 2 is a horizontal partial sectional view taken on the line 2—2 of Fig. 1 illustrating the horizontally disposed and forward extending pedal levers and the pedals secured thereto;

Fig. 3 is a view of the parts in vertical section on the line 3—3 of Fig. 1 illustrating the mechanism associated with the operating pedals;

Fig. 4 is a sectional view along the line 4—4 of Fig. 3;

Fig. 5 is a horizontal sectional view along the line 5—5 of Fig. 1 showing a different section through the mechanism associated with the operating pedals;

Fig. 6 is a sectional view along the line 6—6 of Fig. 5 looking in the direction of the arrows;

Fig. 7 is a sectional view along the line 7—7 of Fig. 5;

Fig. 8 is a sectional view along the line 8—8 of Fig. 3 looking in the direction of the arrows showing the driving sprocket wheel and the ratchet mechanism and pawl associated with the outer concentric shaft of the driving sprocket wheel;

Fig. 9 is a sectional view along the line 9—9 of Fig. 3 looking in the direction of the arrows showing the driving sprocket wheel and the ratchet mechanism and pawl associated with the inner concentric shaft associated with the driving sprocket wheel;

Fig. 10 is a horizontal section upon an enlarged scale of the concentrically arranged shaft portions and the mechanism associated therewith; and Fig. 11 is a sectional view along the line 11—11 of Fig. 10.

Referring now more particularly to the drawings, the numeral 2 generally designates the frame structure of a bicycle rotatably supporting the front and rear wheels 3 and 4. A transversely directed cylindrical housing 5 containing the mechanism of the invention is interposed between the bars 6, 7, and 8 which form a part of the frame structure.

Extending axially through the housing 5 is a divided driving axle or shaft S comprising a left portion 9 (Fig. 10) which extends a predetermined distance into the substantially hollow right shaft portion 10 and is concentric therewith. The outer ends of the respective shafts 9 and 10 are rotatably supported by bearings 13 in the end plates 11 and 12 which are removably secured in the respective end openings in the housing 5. The protruding end of the left shaft portion 9 is provided with a flattened portion which is received in a similar contoured opening in the left forwardly extending pedal lever 14 which is held positioned thereon by the screw bolt 15.

Upon the right side of the vehicle there is mounted a large driving sprocket 16 (Fig. 3)

which is mounted on the right shaft portion 10 of the shaft S and turns freely thereon. The end of the right portion 10 of the shaft S which protrudes through the sprocket 16 is provided with a flattened portion which is received in a similar contoured opening in the right forwardly extending pedal lever 17 and is held positioned thereon by a screw bolt 18.

The driving sprocket 16 as illustrated comprises a central circular disk portion 19 provided with circumferential right and left flanges 20 and 21 and is also provided with radially disposed ratchet teeth 22 and 23 cut in the respective left and right faces of the disk 19. Circular end plates 24 and 25 provided with circumferential flanges 26 and 27 are externally threaded and have threaded engagement with internal threaded flanges 20 and 21 of the sprocket disk 19 and, when in position, provide respective left and right hand cavities 28 and 29.

The left portion 9 of the shaft S is provided with a reduced portion 9' which extends to the right a predetermined distance into the substantially hollow right shaft portion 10. The forward end of the portion 9' is provided with a cylindrical cavity 30 surrounding a stud 31 secured to the left shaft 9 by the pin 40. The stud 31, at its forward end, supports a collar 32 which turns freely thereon and is maintained in position thereon by a nut 33 having threaded engagement with the threaded end of the stud 31. An arm 34, secured to the collar 32, extends through a slot 35 in the right shaft portion 10 into the cavity 28 of the sprocket wheel 16 and has pivotally secured to its upper end a pawl 37 which cooperates with the radially disposed ratchet teeth 22 in the left face of the sprocket disk 19 for purposes to be hereinafter described.

A coil spring 38, having one end secured to the stud 31 and the other end secured to the collar 32, presses the arm 34 at all times against stop 39 formed integrally at the forward end of the left shaft portion 9, as clearly illustrated in Fig. 11. A collar 41 fixed to the right shaft portion 10 has secured thereto an arm 42 extending upward into the right cavity 29 of the sprocket 16. The free end of the arm 42 has pivotally secured thereto a pawl 43 which cooperates with the radially disposed ratchet teeth 23 in the right face of the sprocket disk 19, also for purposes which will presently be described.

The operation of the bicycle will, it is believed, be readily apparent from the foregoing. When the rider of the bicycle, for example, forces the pedal 44 down, the right pedal lever 17 carrying the pedal 44 being secured to the right shaft portion 10 will turn the same independently of the left shaft portion 9. The pawl 43, supported on the shaft portion 10, is spring-pressed against the face of the disk 19, engaging one of the radially disposed teeth 23 to rotate the sprocket 16 through a predetermined degree of rotation. The downward degree of movement of the pedal lever 17 is limited by a pin 45 fixed to the shaft 10 moving into engagement with a stop 46 secured to carriage 47 supported in the housing 5. When the downward thrust is stopped by the engagement of the pin 45 with the stop 46, the pedal lever is again brought back to its substantially horizontal position and simultaneously the left pedal 48, secured to the pedal lever 14, is forced down, and as the lever 14 is secured to the left shaft portion 9, it will turn the same independently of the right shaft portion 10 which is being turned in a counterclockwise direction by the return movement of the pedal lever 14. The arm 34 supporting the pawl 37, being held against the stop 39 on the end of the shaft, as before described, is also moved. The pawl 37, spring-pressed against the disk 19, is engaging one of the radially disposed teeth 22 and rotates the sprocket 16. The downward movement of the pedal lever 14 is limited by a pin 50, fixed to the shaft 9, moving into engagement with a stop 51 secured to the carriage 47.

It is readily apparent that this arrangement permits the levers to be worked up and down alternately or both can be forced down at the same time and allowed to be moved upwardly at the same time, or any other sequence of operation between the levers may be established, or only one need be actuated to effect the turning of the sprocket and transmit power to the gear on the rear wheel through the medium of the sprocket chain 52.

The horizontally disposed pedal levers 14 and 17, in combination with a high gear ratio, provide means whereby the alternate downward thrusts of the pedal levers provide for the transmission of the desired power through the medium of the chain 52 to the sprocket wheel and to the rear wheel of the bicycle with a minimum of effort.

Having described the operation of the mechanism for transmitting power to the sprocket 16 by the alternate up and down movement of the pedal levers 14 and 17, a description of the mechanism which permits the movement of the pedals 44 and 48 along a circular path, will now be described.

The left shaft portion 9 supports a disk 53 which is freely rotatable thereon and is positioned between the end cover plate 11 of the housing 5 and a collar 54 to the shaft portion 9. A pulley extension 55, integral with the disk 52, is linked to the slidable carriage 47, supported by the ways 56 integral with the housing 5, by any suitable means such as a chain or cable 57. The carriage 47 is maintained in its normal extreme right position in the housing 5 with reference to Fig. 3 by a coil spring 58, one end of which is secured to the carriage 47 and its other end to the housing 5, as shown. One end of the cable 57 is secured to one end of coil spring 59 the other end of which is secured to the carriage 47 as shown in Fig. 3. The purpose of this arrangement will presently be described. The cable is carried over the pulleys 60 and 61, supported by the housing 5, and then over the pulley extension 55 of the disk 53 to which one end is secured in any suitable manner.

A collar 62 is slidably supported on the right shaft portion 10 to permit movement to the right or left predetermined distances but rotation about the shaft 10 is prevented by the diametrically opposite ears 63 which are received in slots 64 to the shaft portion 10 in the collar 62. Vertical diametrically opposite pins 65 and 66, secured to the carriage 47, rest in a circumferential groove 67 in the face of the collar 62 and transmit horizontal movement to it along the shaft portion 10 when the carriage 47 is moved to the left as will presently be described.

Assuming the operator of the bicycle has been riding by moving the pedals up and down and wishes to pedal in the conventional manner, as by moving the pedals through a circular orbit, the left pedal 44 is moved in an upward or counterclockwise direction with reference to Fig. 5, causing the left shaft portion 9 to rotate counterclockwise, as seen in Fig. 6. A pawl 68 pivotally secured to an arm 69, fixed to the shaft portion 9, is now moved into engagement with a projection or tooth 70 on the cover member 71 of the disk 53, thus rotating disk 53. Continued rotation of the shaft portion 9, under the influence of the pedal lever 14 in the direction indicated, rotates the disk 53 in a counterclockwise direction causing the cable 57 to be "taken up," thus moving the carriage 47 to the left as seen in Fig. 3. The pin members 65 and 66, secured to the carriage 47, now move the collar 62 to the left along the shaft portion 10. This movement of the collar 62 is arrested when the vertical notch 72 in the left face of the same receives the pin 73 fixed to the left shaft portion 9. The pin 73 and collar 62 resemble a clutch to connect the left and right shaft portions 9 and 10 together for simultaneous rotation. Rotation of the disk 53 also moves a pin 74, secured in the circumferential face of the disk 53, into latching engagement with the latch projection 75 on a spring tensioned retaining pawl (Fig. 6) pivotally secured to a stud integral with the housing 5 at the instant the collar 62 has moved to extreme left position with the pin 73 and collar 62 in clutching position. This latching of the pin 74 against the projection 75 of the pawl 76 locks the disk 53 against rotation and maintains the carriage 47 in its extreme left position under spring tension. When the collar 62 and pin 73 are in clutching position further movement to the left of the carriage 47 is prevented. The disk 53 is, however, permitted to further rotate due to the spring link 59 between the carriage 47 and disk 53.

With the left and right portions 9 and 10 of the shafts S linked together by the pin 73 and collar 62 clutch arrangement, and with the left pedal 14 held in a position substantially opposite the right horizontal pedal arm 17, downward thrust on the right pedal causes the shaft portions 9 and 10 to rotate together. When the carriage 47 is moved to its extreme left position, the stops 46 and 51 fixed thereon are moved out of the path of the stop pins 45 and 50, secured to the respective shaft portions 9 and 10, so that the movement of the feet along circular paths is now possible as is the case with the conventional type of bicycle. The pawls 37 and 43 on the respective shaft portions 9 and 10 by engaging teeth in the respective faces of the sprocket wheel disk 19 effects the turning of the sprocket wheel 16 to transmit power to the rear wheel of the bicycle through the medium of the chain 52.

The operator of the bicycle may at will disconnect the respective shaft portions 9 and 10 so as to again permit the up and down movement of the pedals. To accomplish this, either the left or right pedal is moved in a counterclockwise direction to rotate the connected shaft portions 9 and 10 in the direction indicated in Fig. 6. The pawl 68, fixed to the shaft portion 9, is also turned and further rotation of the disk 53 by the pawl 68 is permitted due to the fact that one end of the cable 57 is secured to the coil spring 59. As the disk 53 is further moved in the direction indicated in Fig. 6, the arm 80 pivoted to the disk 53 and held against the end of a slot 81 in the disk 53 by a spring 82, engages the nose of the pawl 76 and raises the same against the tension of the spring 83 which normally maintains the pawl 76 in the position shown in Fig. 6. The protruding end of the arm 80 is of such length as to raise the forward or free end of the pawl and release the pin 74 in the disk 53 from latching engagement with the pawl 76. This movement of the disk 53 in the direction indicated in Fig. 6 causes the pin 74 to disengage the latch projection 75 on the pawl 76. The protruding end of the pivoted arm 80 is of such height as to raise the forward or free end of the pawl 76 and as the arm is pivoted to the disk 53, it is moved past the latch projection 75 and into engagement therewith. With the various parts positioned as just described, the disk 53 is now free to rotate in a clockwise direction under the influence of the flexed springs 58 and 59 due to the cable connection 57 between the same and the disk 53. The clockwise rotation of the disk 53 causes the arm 80, which is in latching engagement with the latch 75, to move in a counter-clockwise direction about its pivot against the normal tension of the spring 82 which normally keeps the arm 80 against the end of the slot 81. Continued clockwise rotation of the disk 53 will increase the distance between the latch projection 75 and the pivot point of the arm 80, as is readily apparent, and also causes continued counter-clockwise movement of the arm 80 due to the engagement between the latch 75 and the arm 80. The free end of the pawl 76 is moved down under the influence of its spring 83 as the arm 80 moves in a counter-clockwise direction, but the protruding end of the arm 80 is of such height as to permit the pin 74 in the rotating disk 53 to pass the latch projection 75 while the said arm 80 is yet in engagement with the said projection 75. Continued clockwise rotation of the disk 53 tends to further increase the distance between the latch projection 75 and the pivot point of the arm 80 carried thereon. The arm 80 thus reaches a point in its counter-clockwise movement due to the clockwise movement of the disk 53 when the said arm will pass beneath the latch projection 75 and permit the arm 80 to be restored to its normal position against the end of the slot 81 under the influence of the spring 82. The spring 83, associated with the pawl 76, moves the same back to its normal position when the arm 80 has been moved clear of the same. As the springs 58 and 59, associated with the carriage 47, were flexed by the movement of the disk 53 as before described, the carriage 47 is moved to its normal position in the right hand end of the housing 5 under the power of the tensioned spring 58. The disk 53 is also rotated and again restored to its original position. The pins 65 and 66, fixed to the carriage 47, move the collar 62 to the right with reference to Fig. 3 to disengage the pin member 73 fixed in the shaft portion 9. This again permits the shaft portions 9 and 10 to be turned independently to again allow the operator to operate the bicycle by the up and down movements of the respective pedal levers 14 and 17.

The pedals 44 and 48 are provided with toe clips 90 which permit the operator to return the respective pedals upwardly from the farthest downward positions to which they are moved during the alternate up and down movements of the pedals.

The arrangement above described permits the rider to operate a bicycle in either manner at will, thus permitting the use of the propelling means best adapted for use on the supporting surface over which the bicycle is being propelled. It also permits of relaxation or rest by changing, at intervals, from one manner of operation to the other.

When a bicycle is being propelled in the conventional manner by a round and round movement of the pedals, much of the power is wasted as it is applied to the pedals when they are in substantial alignment with the shaft on which they are pivotally supported. It is only when the pedal, to which the operating force is applied, has advanced to a position such that the direction of application of the force is generally at substantially right angles to the pedal arm that the force is being efficiently used. The rest of the time the power is operating more or less directly against the shaft. When, however, the up and down movement of the pedals is employed, the power will be applied practically all the time at substantially right angles to the pedal arm, thus operating at very much greater efficiency. This will permit the use of a much higher ratio between the pedal shaft and the driven wheel, making it possible to attain much higher speeds.

While applicant has disclosed herein an operative form of his invention, it is to be understood that many modifications in the details thereof will readily suggest themselves to one skilled in the art. The invention, therefore, should be limited only by the scope of the appended claims.

I claim:

1. In a bicycle, a housing, a divided shaft rotatable in said housing, a pedal arm fixed with each section of said shaft, a power wheel mounted about said shaft, means interconnecting said pedal arms and said power wheel for driving said wheel incident to a reciprocating movement of said pedal arms and means arranged to be actuated by a predetermined reverse movement of a pedal arm for interconnecting said shaft sections to permit driving said power wheel incident to purely rotary movement of said pedal arms.

2. In a bicycle, a housing, a divided shaft rotatable in said housing, a pedal arm fixed with each section of said shaft, a power wheel mounted about said shaft, means interconnecting said pedal arms and said power wheel for driving said wheel by a reciprocating movement of said pedal arms, means arranged to be actuated by a predetermined reverse movement of a pedal arm for interconnecting said shaft sections in fixed relation to permit driving said power wheel by purely rotary movement of said pedal arms and catch means for maintaining said shaft sections in fixed relation.

3. In a bicycle, a housing, a divided shaft rotatable in said housing, a pedal arm fixed with each section of said shaft, a power wheel mounted about said shaft, means interconnecting said pedal arms and said power wheel for driving said wheel by a reciprocating movement of said pedal arms, means arranged to be actuated by a predetermined reverse movement of a pedal arm for interconnecting said shaft sections to permit driving said power wheel by purely rotary movement of said pedal arms and means actuated by a further predetermined movement of one of said pedal arms for disconnecting said shaft sections.

4. In a bicycle, a housing, a divided shaft rotatably supported in said housing, a pedal arm on each end section of said shaft, a power wheel mounted about said shaft, series of ratchet teeth fixed with said wheel, ratchets, one fixed with each pedal arm and arranged to engage said ratchet teeth, clutch means for joining said shaft sections to prevent relative rotation thereof, means actuated by a reverse movement of one of said pedal arms for rendering said clutch means operative, holding means for holding said clutch means in operative condition and means actuated by a reverse movement of one of said pedal arms for releasing said catch means and said clutch means.

5. In a bicycle, a housing, a divided shaft rotatably supported in said housing, a pedal arm on each end section of said shaft, a power wheel mounted about said shaft, two series of ratchet teeth fixed with said wheel, ratchets, one fixed with each pedal arm and arranged to engage said series of ratchet teeth, respectively, clutch means for joining said shaft sections to prevent relative rotation thereof, means actuated by a reverse movement of one of said pedal arms for rendering said clutch means operative, holding means for holding said clutch means in operative condition and means actuated by a reverse movement of either of said pedal arms for releasing said catch means and said clutch means.

6. In a bicycle, a housing, a divided shaft rotatably supported in said housing, a pedal arm on each end section of said shaft, a power wheel mounted about said shaft, series of ratchet teeth fixed with said wheel, ratchets, one fixed with each pedal arm and arranged to engage said ratchet teeth, clutch means for joining said shaft sections to prevent relative rotation thereof, means actuated by a reverse movement of one of said pedal arms for rendering said clutch means operative, holding means for holding said clutch means in operative condition and means actuated by a greater reverse movement of one of said pedal arms for releasing said catch means and said clutch means.

7. In a bicycle, a housing, a divided shaft rotatably supported in said housing, a pedal arm fixed with each end section of said shaft, a power wheel mounted about said shaft, series of ratchet teeth fixed with said wheel, ratchets, one fixed with each pedal arm and arranged to engage said ratchet teeth and rotate said power wheel upon movement of either pedal arm in one direction, clutch means for joining said shaft sections to prevent relative rotation thereof, means actuated by a reverse movement of one of said pedal arms for rendering said clutch means operative, holding means for holding said clutch means in operative condition and means actuated by a greater reverse movement of said one of said pedal arms for releasing said catch means and said clutch means.

8. In a bicycle, a shaft including two separately rotatable sections arranged substantially in alignment within said housing, pedal arms, one fixed with each of said sections, a power transmitting wheel rotatably mounted about said shafts, series of ratchet teeth fixed with the said power wheel, pawls, one fixed with each pedal arm, said pawls being arranged to operatively engage said series of ratchet teeth, said ratchet teeth and pawls being arranged to cause rotation of said power transmitting wheel incident to the alternate up and down movement of said pedal arms, clutch members for coupling said shaft sections to prevent relative movement thereof, and means responsive to extended reverse movement of one of said pedal arms for moving said clutch members into operative engagement.

9. In a bicycle, a shaft including two separately rotatable telescoping sections arranged substantially in alignment within said housing, pedal arms, one fixed with each of said sections, a power transmitting wheel rotatably mounted about said shafts, series of ratchet teeth fixed with the said power wheel, pawls, one fixed with each pedal arm, said pawls being arranged to operatively engage said series of ratchet teeth, said ratchet teeth and pawls being arranged to cause rotation of said power transmitting wheel incident to the alternate up and down movement of said pedal arms, clutch members for coupling said shaft sections to prevent relative movement thereof, means responsive to extended backward movement of one of said pedal arms for moving said clutch members into operative engagement and latching means for retaining said clutch members in operative relation to permit said power wheel to be rotated by a continuous round and round movement of said pedal arms.

10. In a bicycle, a shaft including two separately rotatable telescoping sections arranged substantially in alignment within said housing, pedal arms, one fixed with each of said sections, a power transmitting wheel rotatably mounted about said shafts, series of ratchet teeth fixed with the said power wheels, pawls, one fixed with each pedal arm, said pawls being arranged to operatively engage said series of ratchet teeth, said ratchet teeth and pawls being arranged to cause rotation of said power transmitting wheel incident to the alternate up and down movement of said pedal arms, clutch members for coupling said shaft sections to prevent relative movement thereof, means responsive to extended reverse movement of one of said pedal arms for moving said clutch members into operative engagement, latching means for retaining said clutch members in operative relation to permit said power wheel to be rotated by a continuous round and round movement of said pedal arms, and means effective, incident to an extensive reverse movement of one of the pedal arms, for disengaging said latching means to permit said power wheel to be again operated by a reciprocatory movement of said pedal arms.

11. In a bicycle, a shaft including two separately rotatable telescoping sections arranged substantially in alignment within said housing, pedal arms, one fixed with each of said sections, a power transmitting wheel rotatably mounted about said shafts, two series of ratchet teeth fixed with the said power wheel, pawls, one fixed with each pedal arm, said pawls being arranged to operatively engage said series of ratchet teeth, respectively, said ratchet teeth and pawls being arranged to cause rotation of said power transmitting wheel incident to the alternate up and down movement of said pedal arms, a clutch for coupling said shaft sections to prevent relative movement thereof, said clutch comprising a member fixed with one shaft section and a second member longitudinally movable relative to the other shaft section, means responsive to extended backward movement of one of said pedal arms for moving said movable clutch member into operative engagement with said fixed clutch member, and latching means for retaining said clutch members in operative relation to permit said power wheel to be rotated by a continuous round and round movement of said pedal arms.

12. In a bicycle, a shaft including two separately rotatable telescoping sections arranged substantially in alignment within said housing, pedal arms, one fixed with each of said sections, a power transmitting wheel rotatably mounted about said shafts, two series of ratchet teeth fixed with the said power wheel, pawls, one fixed with each pedal arm, said pawls being arranged to operatively engage said series of ratchet teeth, respectively, said ratchet teeth and pawls being arranged to cause rotation of said power transmitting wheel incident to the alternate up and down movement of said pedal arms, a clutch for coupling said shaft sections to prevent relative movement thereof, said clutch comprising a member fixed with one shaft section and a second member longitudinally but not rotatably movable relative to the other shaft section, means responsive to extended backward movement of one of said pedal arms for moving said movable clutch member into operative engagement with said fixed clutch member, latching means for retaining said clutch members in operative relation to permit said power wheel to be rotated by a continuous round and round movement of said pedal arms, and means effective, incident to a more extensive reverse movement of one of said pedal arms, for disengaging said latching means to permit said power wheel to be again operated by a reciprocatory movement of one or both of said pedal arms.

13. In a bicycle, a shaft including two separately rotatable telescoping sections arranged substantially in alignment within said housing, pedal arms, one fixed with each of said sections, a power transmitting wheel rotatably mounted about said shafts, two series of ratchet teeth fixed with the said power wheel, pawls, one fixed with each pedal arm, said pawls being arranged to operatively engage said series of ratchet teeth, respectively, said ratchet teeth and pawls being arranged to cause rotation of said power transmitting wheel incident to the alternate up and down movement of said pedal arms, a clutch for coupling said shaft sections to prevent relative movement thereof, said clutch comprising a member fixed with one shaft section and a second clutch member longitudinally but not rotatably movable relative to the other shaft section, means responsive to extended backward movement of one of said pedal arms for moving said movable clutch member into operative engagement with said fixed clutch member, latching means for retaining said clutch members in operative relation to permit said power wheel to be rotated by a continuous round and round movement of one or both of said pedal arms, and means effective, incident to a more extensive reverse movement of either of said pedal arms, for disengaging said latching means to permit said power wheel to be again operated by a reciprocatory movement of one or both of said pedal arms.

JOHN NORRED.